United States Patent [19]

Johnson et al.

[11] Patent Number: 4,894,889
[45] Date of Patent: Jan. 23, 1990

[54] LASHING SYSTEM

[76] Inventors: William N. Johnson, 19 St. Mary's Court, Stamford Brook Road, London, W6, United Kingdom; Gunnar Holmqvist, Farjgardstorget 24, 5th Fl., S11643 Stockholm, Sweden

[21] Appl. No.: 173,412
[22] PCT Filed: Dec. 11, 1986
[86] PCT No.: PCT/GB86/00758
§ 371 Date: Feb. 29, 1988
§ 102(e) Date: Feb. 29, 1988
[87] PCT Pub. No.: WO87/03660
PCT Pub. Date: Jun. 18, 1987

[30] Foreign Application Priority Data
Dec. 12, 1985 [GB] United Kingdom ............... 8530599

[51] Int. Cl.4 ............................................. F16G 15/00
[52] U.S. Cl. .................................... 24/68 CT; 24/68 R
[58] Field of Search ............ 24/68 CT, 68 R, 68 CD, 24/116 R; 254/228; 248/500, 503; 114/75; 410/34, 96, 100

[56] References Cited
U.S. PATENT DOCUMENTS

| 591,703 | 10/1897 | Soseman | 24/68 CT |
|---|---|---|---|
| 721,946 | 3/1903 | Foster | 24/68 CT |
| 2,935,300 | 5/1960 | Elsner | 24/68 CD X |
| 2,973,566 | 3/1961 | Elsner | 24/68 CT X |
| 4,096,816 | 6/1978 | Patterson et al. | |
| 4,297,062 | 10/1981 | Sauber | |

FOREIGN PATENT DOCUMENTS

| 350201 | 4/1928 | Belgium . | |
|---|---|---|---|
| 946137 | 4/1974 | Canada | 24/68 CT |
| 0080520 | 6/1983 | European Pat. Off. . | |
| 2329905 | 5/1975 | France . | |
| 2399584 | 3/1979 | France . | |
| 2444857 | 7/1980 | France . | |

Primary Examiner—James R. Brittain
Attorney, Agent, or Firm—Pearne, Gordon, McCoy & Granger

[57] ABSTRACT

A tensioning and securing device for a lashing system comprises a U-shaped member (10), for engagement with first lashing elements (24) and a cross-member (16) having holes through which the legs of member (10) extend and which can slide up and down the legs of member (10), the member (16) having hooks at its ends for attachment of second lashing elements (25). The ends of the legs of the member (10) carry a formation or formations (20, 34) for supporting the neck of a removable jack (26) by which the cross member (16) may be jacked towards the loop end of the U-shaped member (10) to tension the lashing. Securing elements (18) on the cross member (16) or on the legs of member (10) allow the cross member (16) to be locked in place, then the jack may be collapsed and removed.

4 Claims, 10 Drawing Sheets

LASHING SYSTEM

This invention relates to a lashing system of the kind used, for example, for securing loads on lorries, pallets or other support or transportation means or for securing together a stack of items. Such a lashing system is herein referred to as being "of the kind specified". Lashing systems of the kind specified generally comprise a plurality of ropes, chains, cables, straps or the like, herein referred to as lashing elements, which are extended over or around part of the load or stack and are secured at their ends, to securing attachments carried by the vehicle, pallet or the like or to the ends of other lashing elements. In such systems, it is generally necessary for the lashing elements to be tightened and secured manually and the difficulty arises that is it frequently not possible for one man to tension the lashing means to the degree necessary for complete security before securing the ends of the lashing means and consequently it is not uncommon for a load on a lorry, for example, to shift or to be shed altogether, creating a substantial hazard.

It is one object of the present invention to provide a tensioning and securing device for a lashing system of the kind specified by which adequate tensioning of lashing elements such as chains, cables, straps etc. can be readily achieved by one man and which is yet adaptable to a variety of applications and situations.

According to the invention there is provided a tensioning and securing device for a lashing system of the kind specified comprising a first and a second member each affording an anchorage for a respective lashing element, said first member being guided for movement relative to said second member through a range of relative positions and means for locking said first member with respect to said second member in a selected one of said positions, said first and second members being adapted for engagement with respective parts of an actuating device operable, when so engaged with said members, to move said members relative to one another through at least part of said range of relative positions.

Embodiments of the invention are described below by way of example with reference to the accompanying drawings in which:

FIGS. 4, 4a, 4b and 4c show the application of the system on cargo vessels and the like, FIGS. 5 and 5a to 5e show an elevation view of a variant system and its application in various ways, FIGS. 13–15, 16a, 16b, 16c, 17a, 17b, and 18–21 show further variants and their application. p Referring to FIGS. 1a and 1b, in one embodiment of the invention, a tensioning and securing device is provided for holding connections and tensioning four lashing elements, such as ropes, chains, cables, straps or the like which, in use radiate from the device. The device shown comprises a generally U-shaped (or inverted U-shaped in FIGS. 1a and 1b) member 10 comprising two parallel legs 12 connected by a base part 14. The device further comprises a cross-bar 16 which extends at right angles to the legs 12 and has spaced apart apertures therethrough through which extend the legs 12. The bar 16 is thus guided for sliding movement relative to the member 10, in the longitudinal direction of the legs 12. The member 16 carries locking devices 18 by means of which the bar 16 may be locked in a desired position along the legs 12. The legs 12 have, at their free ends, lugs 20 which project inwardly towards one another and provide abutment surfaces facing towards the base part 14 of the member 10. In use, in the arrangement shown, the lower ends of two upper lashing elements, in the form of rods 24 are connected to the member 10 in the region of the base part 14 whilst the upper ends of two lower lasing members, (in this case lower sections of respective chains 25 the upper sections of which are permanently linked to the straps 24) are connected to the outer ends of the transverse bar 16, for example by being hooked over hook formations 27 provided at the ends of the bar 16. The system is initially so set up that with the bar 16 being in a position relatively remote from the base part 14, as shown in FIG. 1a, substantially all slack is taken up. This may be achieved, for example, by pulling the chains taut manually as far as possible and engaging the appropriate links of chains 25 over the hook formations 27 of the bar 16. The system is now tensioned as follows.

Figure 1A:
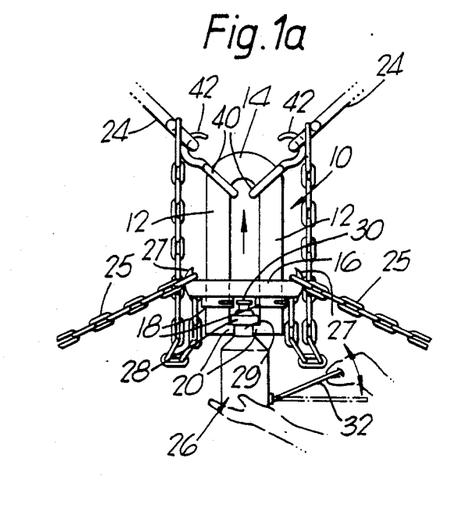
FIGS. 1a and 1b are schematic elevation views showing part of a lashing system embodying the invention before and after tensioning of securing elements.

A jack 26 is fitted between the formations 20 and the transverse bar 16. The jack 26 has a body including a neck 29 which fits between the opposing lugs 20 on the legs 12, a collar 28 which engages over the lugs 20 and provides an abutment surface engaging the abutment surfaces of the lugs 20 which face towards the base 14. The jack 26 further has a ram member 30 which, by manual operation of the jack, can be projected longitudinally from the neck 29, in a direction parallel with the legs 12, to engage the surface of the transverse bar 16 which faces towards the lugs 20. The jack 26 is then operated manually, for example by means of a lever 32, to project the ram 30 from the body 26 to engage the face of the member 16 which faces towards the lugs 20 and thereafter to force the member 16 away from the lugs 20 and towards the base 14, thereby moving the effective ends of the chains 25 further towards the ends of the rods 24 and thereby tensioning the rods 24 and chains 25. When the system has been adequately tensioned, the locking means 18 are operated to fix the bar 16 in position on the legs 12, whereafter the jack 26 is released and removed. If desired, as shown in FIG. 1b, the lugs 20 may be connected by a curved bridge 34 serving simply as a stop to limit transverse movement of the neck 29 into the gap between the lugs 20.

It will be appreciated that the bar 16 is permanently captive on the member 10. Accordingly, to afford flexibility of the use of the securing and tensioning device, the connection of the elements 24 to the member 10 is preferably effected by means of links 40 which extend loosely around the legs 12 and which are provided with hooks 42 to receive the ends of the elements 24.

Figure 1B:
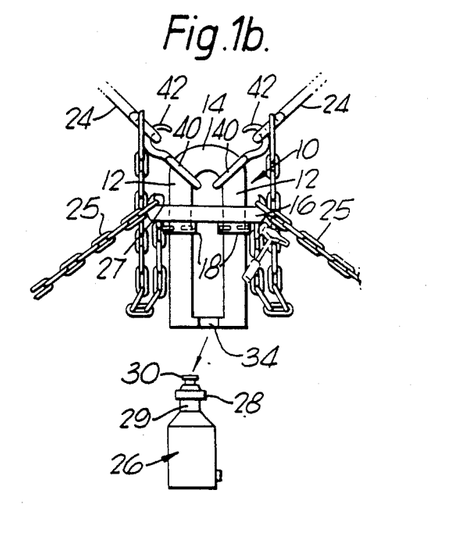
Figure 2A:
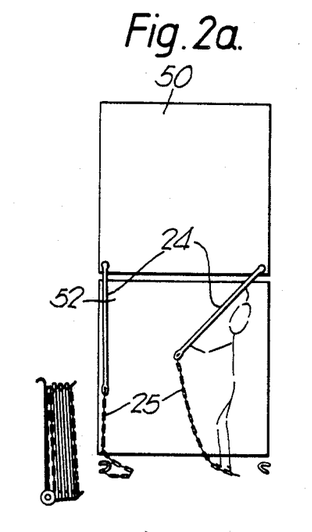
FIGS. 2a to 2c are schematic elevation views showing one application of the system of FIGS. 1a and 1b.
Figure 2B:
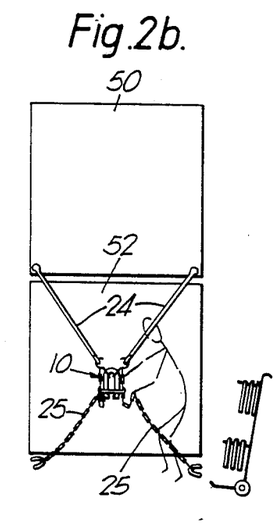
Figure 2C:
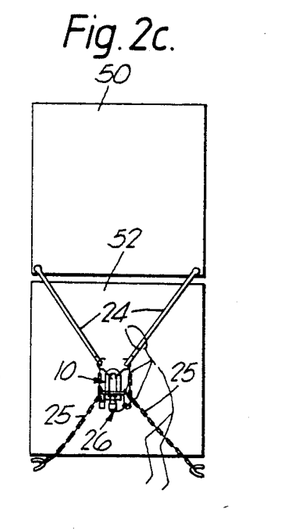

FIGS. 2a to 2c illustrate the manner in which an upper rectangular container 50 is secured on top of a lower rectangular container 52 using the system illustrated in FIGS. 1a and 1b. The rods 24 are pivotally connected adjacent their upper ends to the end face of the container 50 adjacent the lower corners thereof whilst the lower ends of the chains 25 are connected by shackles to the support upon which the lower container 52 rests. As shown in FIGS. 2a and 2b, the lower ends of the rods 24, and the upper ends of the chains 25 connected thereto are swung towards each other and hooked on to the respective hooks 42 on the member 10, the appropriate links on the chains 25 fitted on the respective hooks on the transverse bar 16 then, as shown in FIG. 2c, the straps or chains are tensioned using the jack 26 as described above.

Figure 2D:
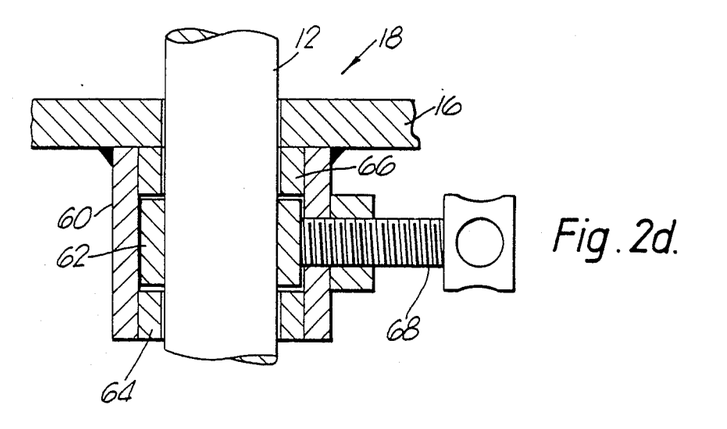
FIG. 2d is a fragmentary sectional view of a locking means of a device forming part of the system.
Figure 3:
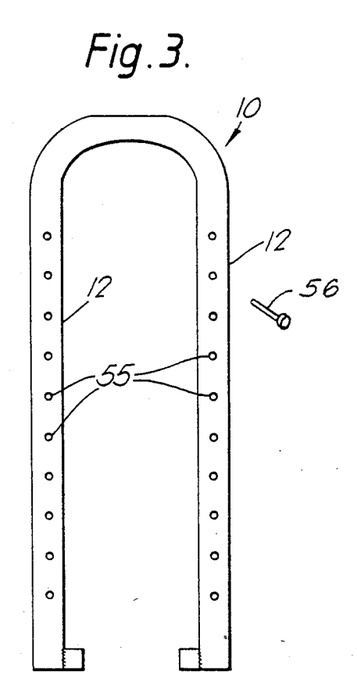
FIG. 3 is an elevation view of a variant member forming part of a tensioning and securing device of the system.

FIG. 3 shows a variant form of U-shaped member 10, in isolation, to a larger scale than FIGS. 1a and 1b. In the form illustrated, the legs 12 each have a series of transverse bores 55 therethrough to receive a locking pin 56, for each leg, removably insertable beneath the transverse bar 16 to hold the latter in a desired position, in use by preventing movement of the bar 16 away from the base part 14. In the arrangement of FIGS. 1a and 1b, however as illustrated in FIG. 2d, each locking device 18 comprises, carried by the bar 16 on its side nearer the free ends of the legs 12, around each leg 12, a respective tubular collar 60 within which is a clamping ring 62 fitted closely around the respective leg 12 and held captive within the collar 60, for example between annular inserts 64 and 66 secured to the collar 60 internally. A locking screw 68 extends through a transverse screw-threaded bore in the collar 60 and bears at its inner end against the periphery of the ring 62. The bar 16 can thus be secured to the legs 12 by tightening the screws 68 thereby pressing the ring 62 tightly against the surfaces of the leg 12 to grip the leg. The screws 68 have heads formed to receive apporpriate tools, for example, as shown, formed with transverse bores to receive a tommy bar, or simply provided with non-circular, eg hexagonal, heads to receive a corresponding tool.

Figure 4A:
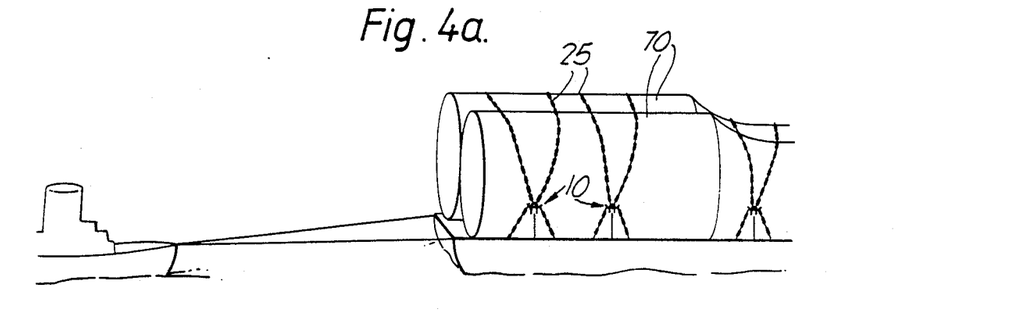
Figure 4B:
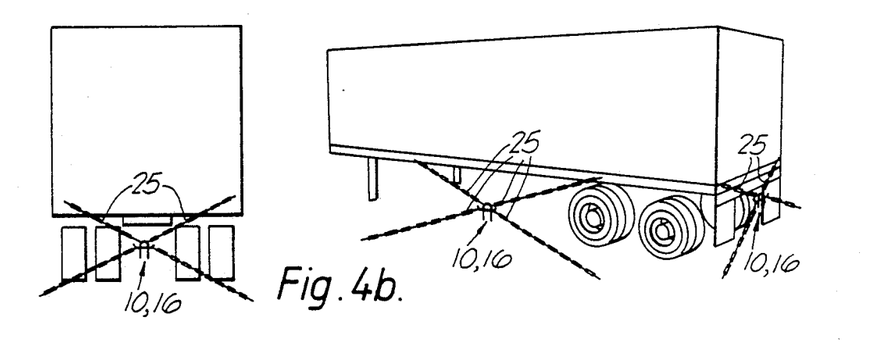
Figure 4C:
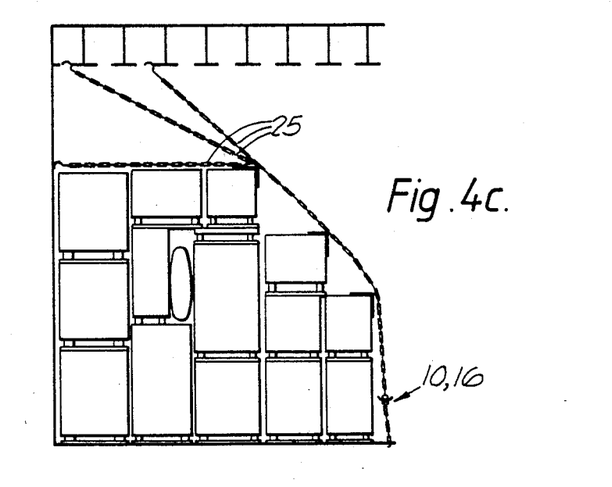

FIG. 4a illustrates how cargo items 70 may be secured to a barge by means of chains 25 tensioned using the device substantially as described with reference to FIGS. 1a and 1b, whilst FIG. 4b shows the use of such a device, in conjunction with chains 25, to secure an object, such as a trailer on a flat surface such as the deck of a vessel. FIG. 4c illustrates the manner in which containers or the like stacked between decks in a vessel may be secured using upper chains 25 each secured at its upper end to an attachment point fixed to the vessel above the stack, lower chains 25 each secured at its lower end to an attachment point fixed to the deck of the vessel on which the stack rests, and securing and tensioning devices 10, 16 according to FIG. 1a or 1b connecting the lower ends of the upper chains and the upper ends of the lower chains.

Figure 5:
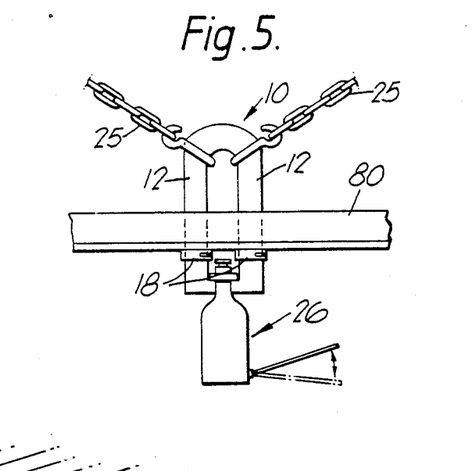
Figures 5A, 5B:
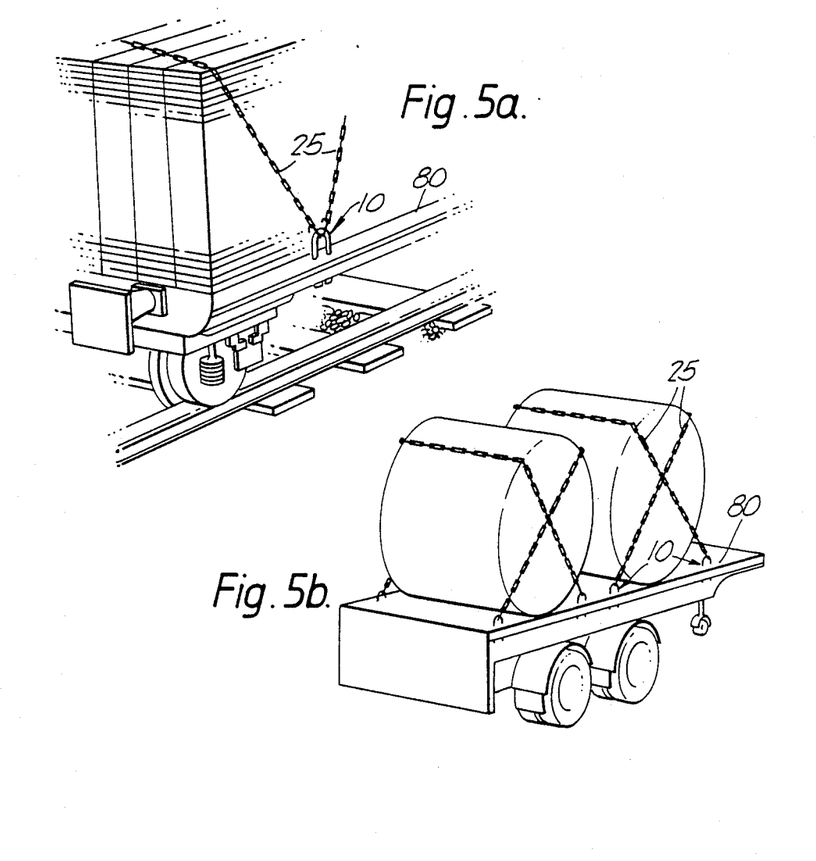
Figure 5C:
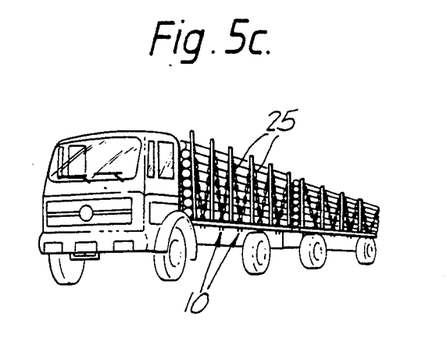
Figure 5D:
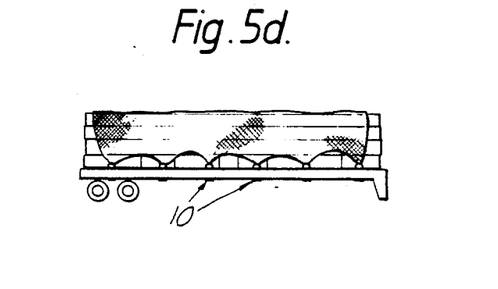
Figure 5E:
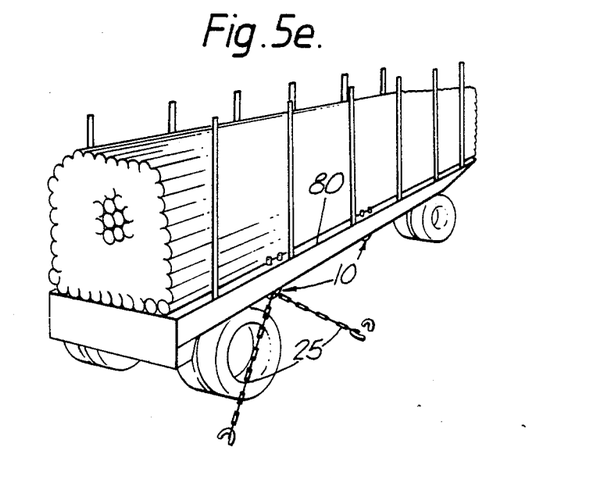

Devices operating on the same principles as described with reference to FIGS. 1a and 1b may be fitted permanently to a rigid body, such as the body of a vehicle or vessel or other transport facility, and in certain cases this allows the provision of a separate cross-bar 16 to be dispensed with. Thus, as shown in FIG. 5, an appropriate structural member of the vehicle, for example a girder 80 forming a sill of a load bearing platform of a lorry or a wagon may itself be provided with spaced apart apertures through which the legs 12 of a member 10 extend, locking devices 18 being secured, in this case, directly to the member 80. Thus, in the arrangements of FIGS. 5a to 5d, the members 10 are arranged with their legs 12 passing vertically through apertures in horizontal members 80 extending along the sides of the respective load bearing platform whilst chains 25 extended over the top and sides of the load on the platform are connected with the hooks 42 of the members 40 engaged around the members 10. The chains 25 are tensioned, as before, by engaging the neck 29 of the jack body between the legs 12 with the collar 28 above formations 20 and operating the jack to extend the ram part 30 upwardly to engage the undersurface of the member 80, thereby drawing the member 10 downwardly and tensioning the chains 25. The locking means 18 are then secured to fix the legs 12 with respect to the member 80, the jack released and removed as before. Preferably, a plurlity of members 10 is provided at intervals along each side member 80, as illustrated in FIGS. 5b and 5c, for tensioning respective sets of lashing chains 25. It will also be appreciated that, as illustrated in FIG. 5d, a plurality of individual chains 25 may be replaced by a single lashing element in the form of a retaining net or awning retained at intervals at a plurality of locations, by respective ones of a plurality of members 10.

A similar system may be used for securing a vehicle, in the arrangement shown a timber carrier, with respect to a surface such as the deck of a vessel. In this case the laching arrangement is inverted as compared with FIGS. 5 and 5a to 5d in the sense that the members 10 have their bases 14 below the sill member 80 with their legs 12 extending upwardly through the respective apertures of the sill members 80 and the chains 25 extending from the links 40 around the lower parts of the members 10 to respective shackles on the deck or like surface on which the vehicle rests. In this case, of course, the jack is arranged in an inverted position to act between the upper surface of the sill 80 and the projections 20 of the device being acted on.

Figure 6:
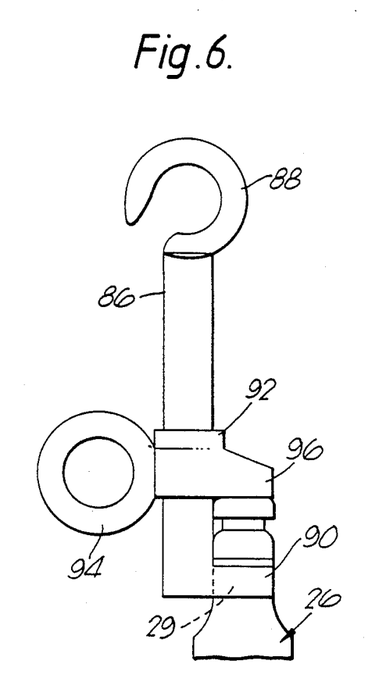
FIG. 6 shows components of a further tensioning and securing device embodying the invention.

FIG. 6 shows, in elevation, another form of tensioning and securing device for a lashing system embodying the invention. The device of FIG. 6 again comprises two members one of which is movable relative to the other, and can be fixed with respect to the other. In this case, one member takes the form of a straight rod 86 carrying at one end a hook formation 88 and carrying at the other end a fork 90 (only one arm of which is shown in FIG. 6) extending transversely from the rod 86 and adapted to receive the neck portion 29 of the jack 26. The other member includes a collar 92 encircling the rod 86 and formed as a close sliding fit thereon, a ring 94 secured to the collar 92 projecting therefrom and an abutment member 96 projecting from the collar 92 on the opposite side from the ring 94 and in longitudinal alignment with the fork 90. In use, the jack 26 is fitted as shown with the neck 29 engaged between the arms of the fork 90, the collar 28 resting on the surfaces of the arms of the fork 90 which face towards the member 96 and the extendible ram 30 of the jack cooperating with an abutment surface of member 96 which surface faces towards the fork 90. The collar 92 has locking means (not shown) associated therewith similar to that described in relation to the previous embodiments. In use, one lashing element or set of lashing elements is secured to the ring 94 and another lashing element or set of lashing elements is engaged with the hook 88, then the jack is fitted and the ram extended to force the member 92, 94, 96 away from the fork 90 and towards the hook 88 until the desired tensioning has been achieved, whereafter the member 92, 94, 96 is locked in position and the jack released and removed.

Figures 7, 8, 9, 10, 11:
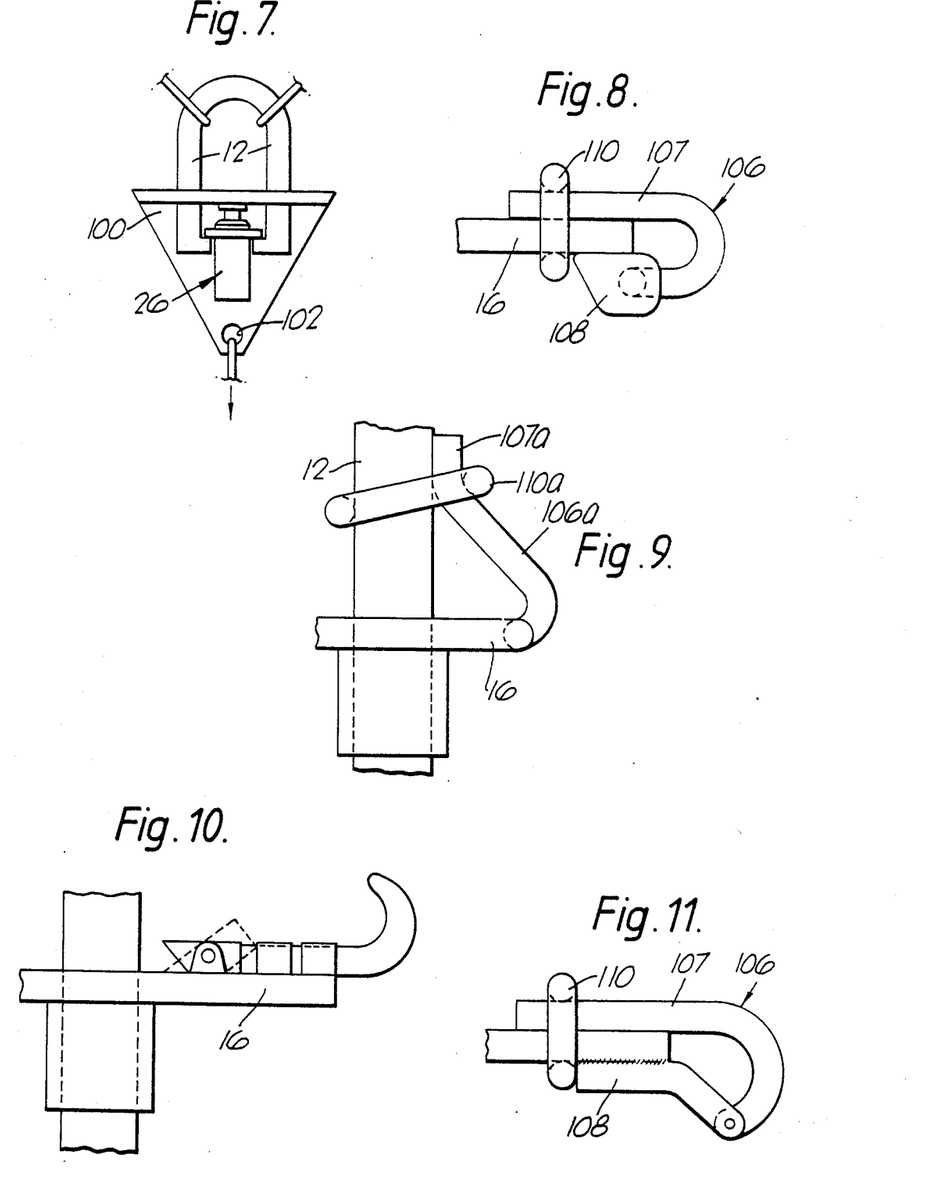
FIG. 7 shows a yet further device embodying the invention.
FIGS. 8 to 11 show quick release devices which may be incorporated in the system and FIGS. 12a and 12b illustrate, in vertical section and in plan respectively, a strap securing device which may be incorporated in the system.

FIG. 7 illustrates a further variant tensioning and securing device which is similar to that of FIGS. 1a and 1b but differs in that the cross-bar 16 is formed integrally with a bracket member 100 which has a side part extending downwardly, past the lower ends of the legs 12 to terminate in a single attachment point 102. This form of the device is particularly suited for connecting and tensioning lashing elements extending from the device in a generally "Y" shaped formation, with two lashing elements being connected with the upper part of the member 10 in the same way as in FIGS. 1a and 1b and a remaining single lashing element being secured to the attachment point 102. The member 100 is, of course, so configured and dimensions as not to interfere with the insertion of and removal of the jack. For example, the side part of the member 100 extending downwardly to attachment point 102 may extend only on one side of the device, allowing insertion of and removal of the jack from the opposite side.

FIGS. 8 to 11 show arrangements which may be provided at either or both ends of the cross-bar 16, for example, in place of the fixed hooks 27 thereon. The arrangement shown in FIG. 8 comprises a generally "J" shaped member 106 mounted for pivoting in the common plane of the axes of the legs 12 in a bracket 108 welded to or formed integrally with the end of the bar 16. In the position shown in FIG. 8, the longer arm of the "J" lies closely against the upper surface of the bar 16 and the member 106 defines with the bar 16 and the bracket 108 a closed loop through which a lashing element such as a rope, chain or the like may be passed or through which can pass an attaching ring, hook or the like. The member 106 is held in the position shown by a ring 110 which extends around the bar 16 and the longer arm 107 of the "J". The lashing element or the like extending through the loop defined by the "J" can be released simply by sliding the ring 110 to the left in FIG. 8 and pivoting the member 106 about its pivotal mounting at the end of the shorter arm of the "J" so as to swing the longer arm 107 upwardly allowing the lashing element, attachment hook or the like to be passed over the longer arm 107 at the free end thereof.

In a variant, shown in FIG. 11, the bracket 108 and member 106 are of slightly different form, such that if the ring 110 is driven to the left so as to clear the free end of the longer arm of the "J", the tension of the lashing element or the like passing through the loop of the "J" will cause the member 106 to swing through almost 180° automatically releasing the lashing element or the like.

FIG. 9 shows a further variant, which is similar to that of FIG. 11 except that the member 106a, of modified shape, is pivotally connected directly to the free end of the bar 16 and has an end part 107a which, in the closed position, lies against the respective leg 12 of the member 10, a corresponding retaining ring 110a extending in this case around the leg 12 and the part 107a. The lashing element, securing hook or the like pressing through the loop defined between the member 106a, the adjacent leg 12 and the bar 16 may be readily released by knocking the ring 110a upwards to clear the upper end of the part 107a allowing the member 106 to spring outwardly and downwardly.

FIG. 10 shows, attached to a cross-bar 16, a further form of quick-release hook.

Figure 12A:
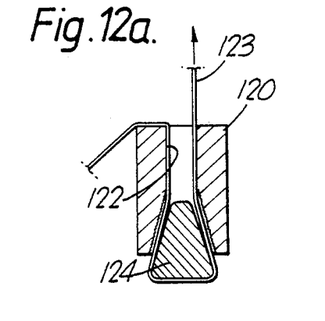
Figure 12B:
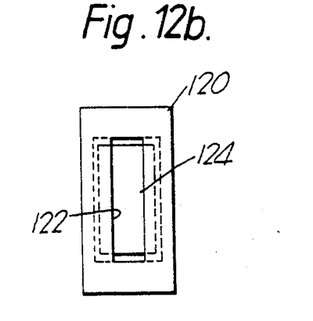

FIGS. 12a and 12b illustrate schematically a device for securing a retaining strap, for example in the form of a length of webbing, in a securing element, for example secured to the bodywork of a vehicle. The securing element is in the form of a body 120 providing a slot 122 therethrough which diverges towards one end (shown lowermost in FIG. 12). The slot 122 is elongate in a direction perpendicular to the plane of FIG. 12a, i.e. in a direction which, in use, is also the direction of the width dimension of the webbing. Mounted within the slot 122 is a wedge member 124 which is also elongate in the width direction of the webbing. The member 124 is retained, in manner not shown, in element 120 in such a way that it can move freely to a limited extent upwardly and downwardly and from side to side as viewed in FIG. 12a. The strap, indicated at 123 is passed through the narrower end of the slot 122 to the opposite, wider end, is passed around the wedge element 124 and passes upwardly again through the slot 122, on the opposite side of element 124 to pass again through the narrower end of the slot. When tension is exerted on the portion of the strap 123 extending from the narrower end of the slot 122 member 124 is free to move under the force thus exerted upon it until it is pulled into the narrower portion of the diverging part of the slot to provide a wedging action whereby the strap is clamped between the diverging wall parts of the slot and the opposing surfaces of the approximately triangular section member 124. The opposing surfaces of the member 124 and the slot are preferably provided with ribs or corrugations facilitating the gripping action on the strap.

It will be appreciated that the devices of FIGS. 8, 9, 10 and 11 and the band strap of FIG. 12 need not be fixed to the cross-bar 16 but may, for example, be attached fixtures remote from the tensioning and securing device and adapted to receive the ends of the respective lashing elements remote from the ends which are engaged with the respective tensioning and securing device.

Figure 16A:
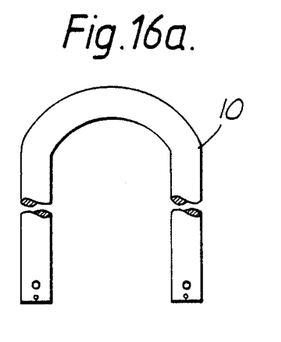
Figure 16B:
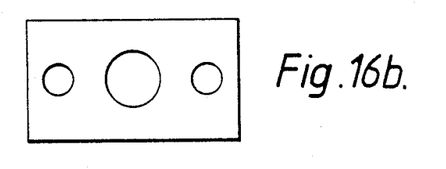
Figure 16C:
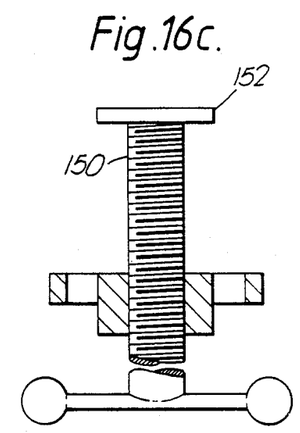

Referring to FIG. 16, a variant of the device of FIGS. 1a and 1b is shown in which the legs of the member 10 are of uniform cylindrical form right to their free ends and a separately formed bottom plate, shown in plan at B, is slipped over the free ends of the legs of the member 10 and is thereafter retained on the member 10 by pins passed through transverse holes in the free ends of the limbs of the member 10. The bottom plate, in addition to having respective holes to receive the limbs of the member 10, has a central screw threaded hole in which, as shown at C in FIG. 16, receives a jacking screw 150 having a handwheel, swing weights or the like at its lower end and a thrust plate 152 at its upper end for engagement with the underside of the cross bar 16, (not shown). Thus, a lashing using the device of FIG. 16 may be tensioned manually by rotating the handwheel or swing weights.

Figure 15:
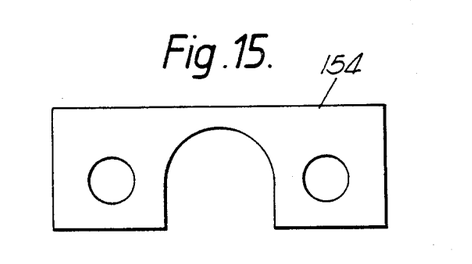

Referring to FIG. 15, a variant bottom plate is shown at 154 which, when fitted over the free ends of the legs of the member 10 such as shown in FIG. 16, provides an equivalent to the bridge formation 34 of FIG. 1b, to receive the collar around the neck of the bottle jack 26.

Figures 13, 14:
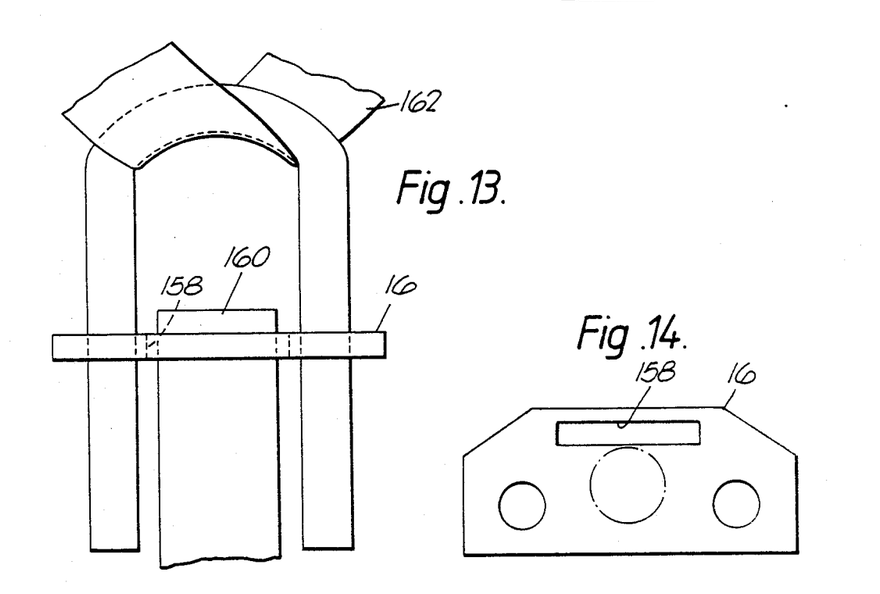

FIGS. 13 and 14 illustrate a variant of this device, for use in a manner analogous with the device of FIG. 7, in which the cross member 16 is provided with a slot 158 to receive a downwardly extending lashing strap 160 (FIG. 13) a loop of a further lashing strap 162 being passed through the loop of the member 10 to present a "Y" configuration as in FIG. 7.

Figure 20:
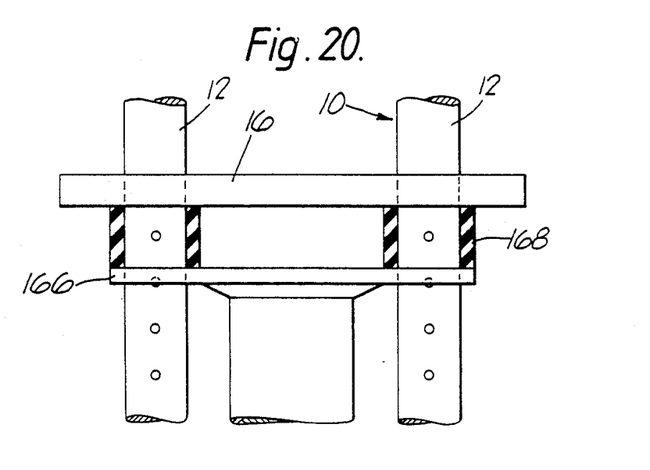

FIG. 20 illustrates a further feature which may be employed to overcome a difficulty which can arise with embodiments in which the cross-bar 16 is located by pins passed through transverse holes in the legs of the member 10, namely that when the lashing is fully tightened, the cross member 16 may not be ideally located with respect to any set of transverse holes provided through the legs of the member 10. To this end, the cross member 16 has, mounted therebelow, and likewise freely slidable on the limbs of the member 10, a supplementary cross member 166, and located between the members 16 and 166 are respective annular resilient members 168, each extending around a respective one of the limbs of the member 10. The members 168 may be formed of rubber or may be coil springs. In use of this feature, once the jack has been extended sufficiently to tighten the lashing, the jack is extended further to push the cross member 166 closer to the cross member 16 thereby compressing the members 168 until a suitable set of transverse holes in the limbs of the member 10 is disclosed by the plate 166, whereupon the cross pins may be inserted and the jack released as before.

Figures 17A, 17B:
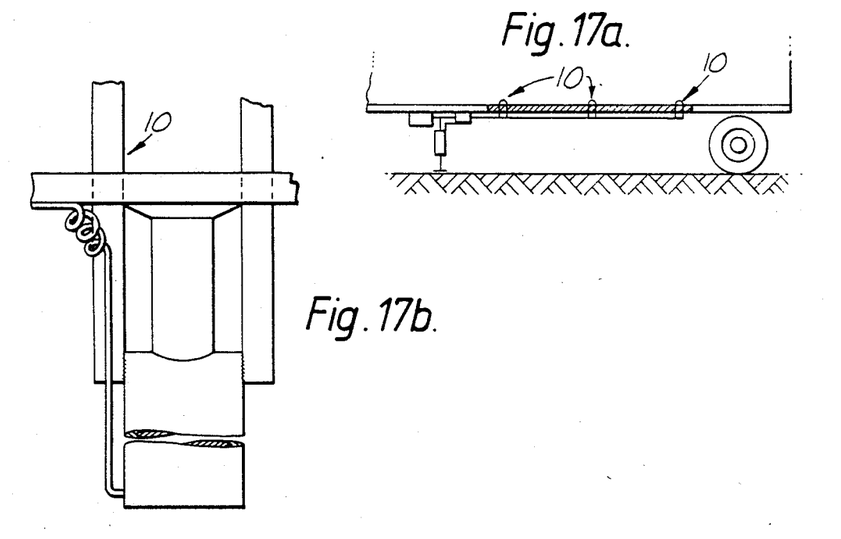

FIG. 17 illustrates, at A, how a plurality of tensioning members of the sort shown in FIG. 5, for example, may be tensioned automatically. In this case, each member 10 and associated parts in equipped permanently with its own hydraulic jack and these jacks are connected in a hydraulic circuit extending to a hydraulic pump unit driven by an electric motor, whereby the lashings may be tightened by energising the motor. In this arrangement, the hydraulic circuit may also serve a hydraulic jacking leg provided at the front of a detachable trailer to support the latter when the associated tractor unit is disconnected. FIG. 17B shows in detail how the individual members 10 and associated jacks in this arrangement may be configured.

Figure 21:
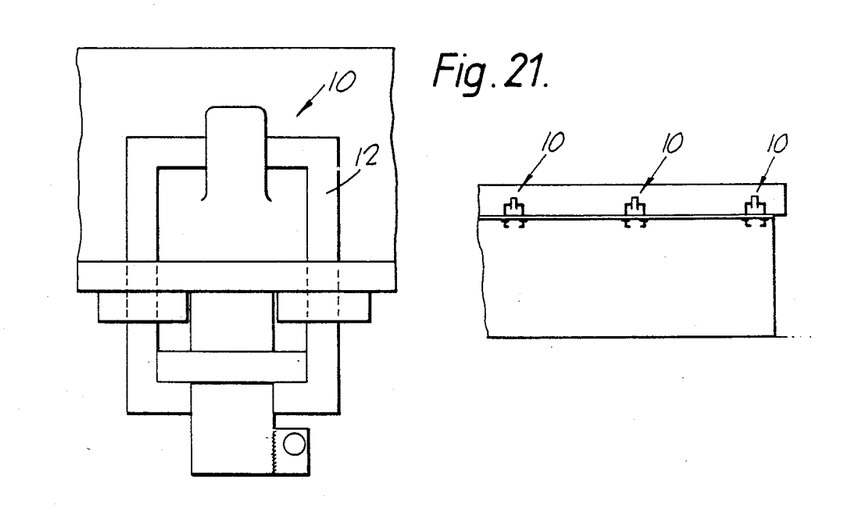

FIG. 21 illustrates how a hatch on a cargo vessel, for example, may be battened down by cleat arrangements incorporating members similar to the members 10, 12 of FIG. 5.

Figure 19:
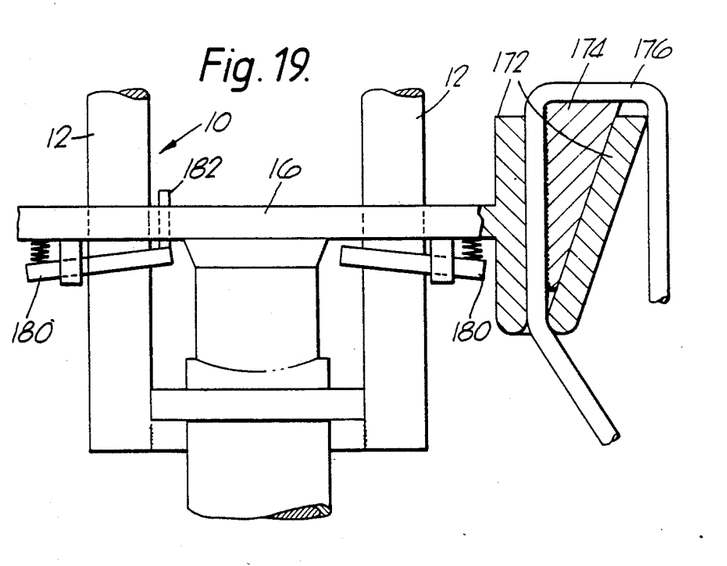

FIG. 19 illustrates a strap tensioning arrangement, utilising a principle similar to that utilised in FIGS. 12A and 12B. Accordingly, a jacking member, which may be similar to the member 10, 12 of FIG. 5, has a cross member 16 which carries at one free end (or both free ends—not shown) a strap gripping device 172 defining a tapering slot in which is accommodated a wedging member 174 adapted to grip a nylon lashing strap 176. In the device of FIG. 19, the cross member 16 is held in place on the legs of the member 10, when the jack is removed, by floating steel locking washers 180 held captive on the cross member 16 in such a manner as to tilt and thereby jam on the legs of the member 10 under the influence of the forces tending to loosen the lashing. The washers 180 can be released, when desired, by providing release pins such as indicated at 182 which may be tapped to "straighten" the washers 180 relative to the legs of the member 10 allowing the cross members 15 to slip down again.

Figure 18:
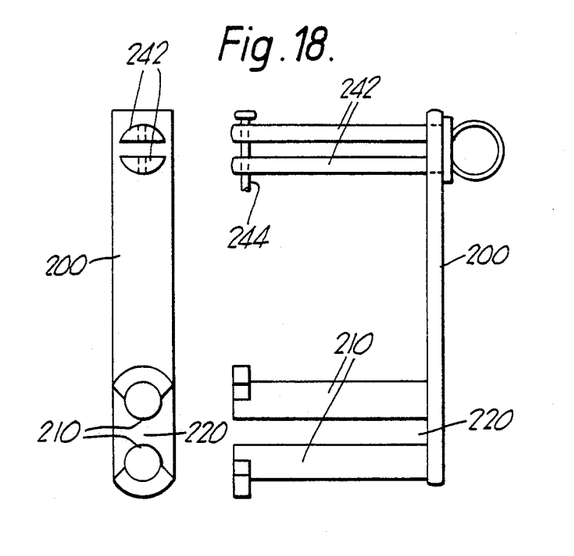

FIG. 18 shows a device which may be used for tightening a lashing strap additionally. This device comprises an elongate lever arm 200 from which extend, at right angles thereto, adjacent one free end of the elongate lever arm 200, two parallel rods 210 which define between them a gap 220 into which a lashing strap to be tightened can be passed, the device then being rotated about an axis parallel with and extending midway between the two rods 210 to wind the lashing strap around the composite "drum" defined by the rods 210 together. In order to hold the device in position once the desired tension has been reached, the other end of the elongate lever plate 200 is provided with an aperture to receive a split pin member 242 which can be inserted through the aperture so that its legs extend on either side of the tightened lashing strap, the end of the slot, defined between the legs 242, within which the lashing strap is trapped being then closed by a transverse pin 244.

We claim:

1. A tensioning and securing device for a lashing system comprising a first member and a second member, an actuating device having two relatively movable parts, means on said first member for anchoring a lashing element, means on said second member for anchoring a lashing element, said first member being in the form of a U-shaped bar having two paralllel legs and a portion connecting one end of each leg to the adjoining end of the other leg thereby defining a base, said second member being a cross-piece extending across said parallel legs perpendicular thereto and having two apertures therethrough, each of said parallel legs of said first member extending through a respective said aperture, whereby the cross-piece is movable along said parallel legs through a range of positions therealong, locking means for locking said cross-piece with respect to said parallel legs in a selected one of said positions, said parallel legs having, at their free ends, inwardly projecting formations providing abutment surfaces facing towards the base of the U-shaped bar whereby said actuating device can be applied with said parts thereof lying between, on the one hand, said abutment surfaces and, on the other hand, the part of the cross-piece between said legs, and the actuating device operable to force the cross-piece along the legs away from said inwardly projecting formations, the actuating device being releasably engageable with said abutment surfaces.

2. A device according to claim 1 wherein said locking means comprises retaining pins insertable into transverse bores formed through said legs.

3. A device according to claim 1 wherein said locking means includes clamping screws screw-threadedly engaged in collars encircling said legs, whereby the clamping screws can be tightened to act against the sides of the respective said legs and fix said collars encircling said legs in position with respect to said legs.

4. A lashing system including a device according to any one of claims 1, 2 or 3, a plurality of lashing elements, as herein defined and said actuating device detachably engageable with said first and second members and operable to move said first member relative to said second member with said locking means inoperative whereby said first member can be locked with respect to said second member by operation of said locking means, whereafter the actuating device can be disengaged from, and removed from, said first and second members.

* * * * *